United States Patent Office 3,404,402
Patented Oct. 1, 1968

3,404,402
AIRCRAFT LANDING AIDS USING CROSS
CORRELATION TECHNIQUES
John Benjamin, Farnborough, and George Farren Clarke, Franham, England, assignors to Minister of Aviation in Her Majesty's Government of the United Kingdom of Great Britain and Northern Ireland, London, England
Filed Sept. 18, 1964, Ser. No. 397,657
Claims priority, application Great Britain, Sept. 20, 1963, 37,200/63; Feb. 19, 1964, 6,990/64
31 Claims. (Cl. 343—108)

The present invention relates to instrument landing systems. In the azimuth guidance part, or in the glide path guidance part, of present day instrument landing systems, two radio beams are transmitted down an airfield runway so that they overlap symmetrically about the runway centre-line or about the desired glide path respectively. In each case, the overlapping radio beams are modulated by audio tones having frequencies of 90 cycles/second and 150 cycles/second respectively. A receiving system in an aircraft landing on the runway detects these radio beams and compares their strengths. When the receiving system receives both modulated beams with equal amplitudes, the aircraft is deemed to be over the runway centre-line, or on the desired glide path as the case may be.

Instrument landing systems at present in use are liable to be rendered inaccurate by external interference so that their application to blind landing or to automatic landing systems tends to be unreliable.

It is an object of the present invention to provide an instrument landing system which is less likely to be affected by external interference.

It is desirable that any new instrument landing system designed to overcome the above-mentioned difficulties should, as far as possible be compatible with present-day instrument landing systems, particularly as far as the aircraft receiving system is concerned.

It is an object, therefore, of the present invention in one aspect thereof to provide an instrument landing system in which the aircraft receiving system comprises only a small modification to existing aircraft receiving systems.

According to the present invention, there is provided transmitter apparatus for an instrument landing system and including two aerials situated adjacent an aircraft runway and means for feeding signals to the aerials, the signals being so modulated that they yield two distinctive cross-correlation products which are equal in amplitude when the signals are received on a desired guidance path and which vary differentially in amplitude with respect to one another as the point of reception moves from one side to the other of the desired guidance path.

According to a feature of the present invention, there is provided transmitter apparatus for an instrument landing system and including a first transmitter aerial and a second transmitter aerial both located adjacent an aircraft runway, means for feeding a first signal modulated by a first modulation signal to the first aerial, means for feeding a second signal modulated by a second modulation signal to the second aerial, means for feeding to the second aerial a third signal modulated by a third modulation signal, the first modulation signal together with the second and third modulation signals yielding two cross-correlation products which are equal in amplitude when the signals are received on a desired guidance path and which vary differentially as the point of reception moves from one side to the other of the desired guidance path.

According to a feature of the present invention in another aspect thereof, there is provided transmitter apparatus for an instrument landing system and including a first transmitter aerial and a second transmitter aerial both located adjacent an aircraft runway, means for feeding a first signal modulated by a first modulation signal to the first aerial, means for feeding a second signal modulated by a second modulation signal to the second aerial, means for feeding a third signal modulated by a third modulation signal to the first aerial and means for feeding a fourth signal modulated by a fourth modulation signal to the second aerial, the first modulation signal together with the second modulation signal and the third modulation signal together with the fourth modulation signal yielding two cross-correlation products which are equal in amplitude when the signals are received on a desired guidance path and which vary differentially in amplitude with respect to one another as the point of reception moves from one side to the other of the desired guidance path. The desired guidance path may be an azimuthal localiser course line or may be a glide path defining a line of descent. The cross-correlation products hereinbefore referred to are produced by the multiplication together of signals bearing the various modulation signals and subsequent integration of the resulting product signals. These modulation signals may be in many different forms. For example, the modulation signals may be in the form of pulses of suitable shapes or may be noise, such as thermal noise.

It is desirable that the cross-correlation products yielded by the signals transmitted by the aerials should be compatible with signals at present received by aircraft operating in conjunction with instrument landing systems already in existence. In order for this to be so, the signals fed to the aerials are such that the two distinctive cross correlation products each have a separate and distinctive modulation frequency. These modulation frequencies are 150 c./s. and 90 c./s. In addition the signals fed to the aerials are such that they yield a third cross-correlation product the amplitude of which does not vary greatly as the point of reception moves transversely of the runway at distances from the desired guidance path at which the landing system is to operate. This cross correlation product has a frequency lying in the band 108 mc./s. to 112 mc./s.

According to the present invention in another aspect thereof, aircraft receiver apparatus for use in conjunction with the aforementioned transmitter apparatus includes an aerial, a multiplier circuit for multiplying together the various signals received at the aerial, a receiver for receiving and integrating the product signals at the output of the multiplier to yield cross-correlation products and means for separating out distinctive modulation signals from the cross-correlation products.

In order that the invention may be more clearly understood, embodiments thereof will now be described with reference to the accompany drawings, in which.

Figure 1:
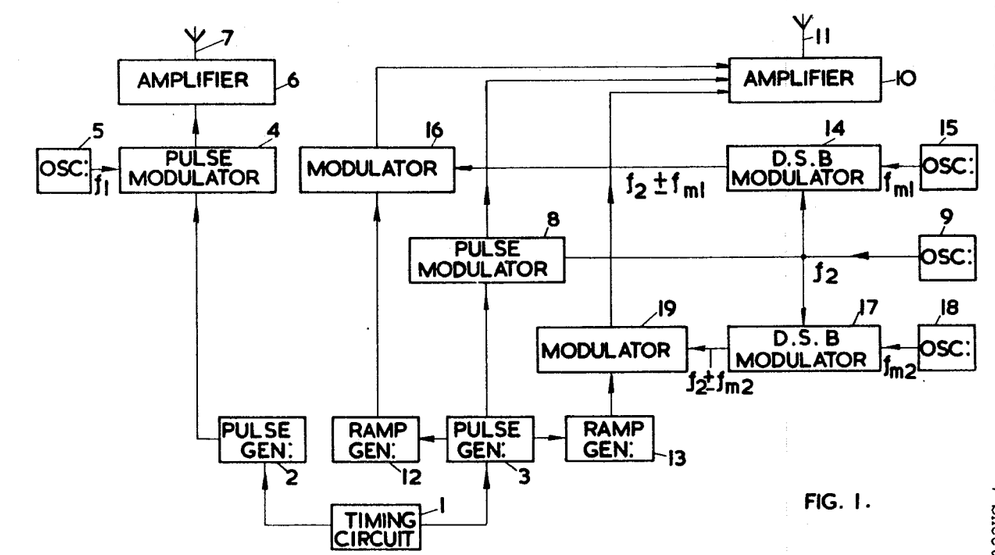
FIGURE 1 is a block circuit diagram of transmitter apparatus for an instrument landing system.

FIGURE 1 shows a timing circuit 1 which controls two pulse generators 2 and 3. Output pulses from the pulse generator 2 modulate, in a pulse modulator 4, a signal of frequency $f_1$ derived from an oscillator 5. The resultant pulse modulated signal is amplified in an amplifier 6 and thence transmitted from an aerial 7. Output pulses from the pulse generator 3 modulate, in a pulse modulator 8, a signal of frequency $f_2$ derived from an oscillator 9. The resultant pulse modulated signal is amplified in an amplifier 10 the output from which is transmitted via an aerial 11. The pulse generator 3 also provides outputs controlling two ramp generators 12 and 13.

The output of the oscillator 9 is modulated in a suppressed carrier double sideband modulator 14 with the output, of frequency $f_{m1}$, of an oscillator 15. The output of the modulator 14 is amplitude modulated in a modulator 16 with the output of the ramp generator 12. The output of the modulator 16 is applied to an input of the amplifier 10. The output of the oscillator 9 is also modulated in a suppressed carrier double sideband modulator 17 with the output, of frequency $f_{m2}$, of an oscillator 18. The output of the modulator 17 is amplitude modulated in a modulator 19 with the output of the ramp generator 13. The output of the modulator 19 is applied to a further input of the amplifier 10.

Figure 2:
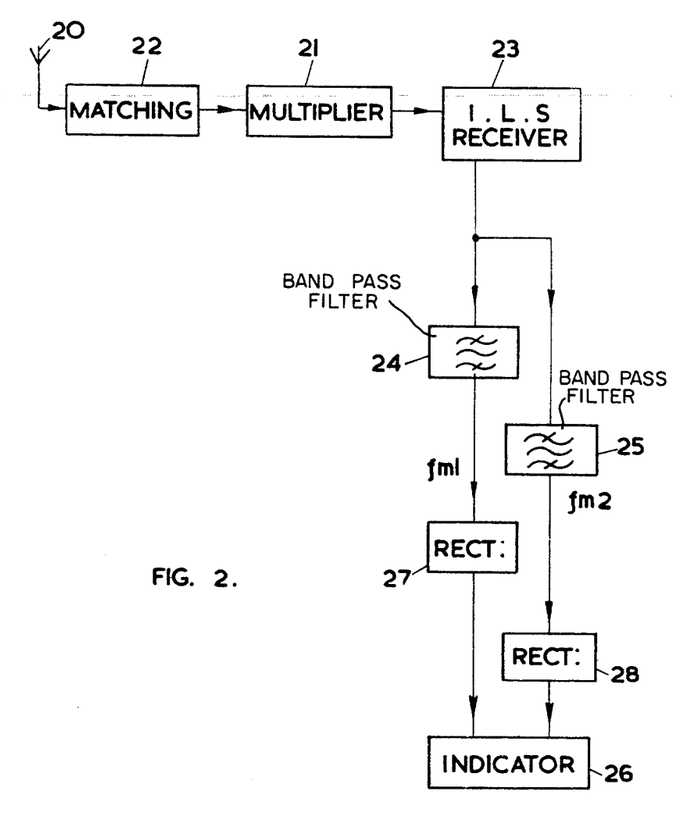
FIGURE 2 is a block circuit diagram of receiving apparatus for an instrument landing system.

FIGURE 2 is a block circuit diagram of an aircraft radio receiver for receiving and interpreting the signals received from the transmitter arrangement shown in FIGURE 1. FIGURE 2 shows an aerial 20 which may be a horn aerial having a fan-like radiation pattern and so oriented on an aircraft as to receive radio signls from the ground head of the aircraft. The aerial 20 feeds a multiplier 21 through a matching device 22 such as cavity resonator. The multiplier 21 may be any nonlinear circuit, such as a diode mixer, so that signals fed into it form product signals in passing through the multiplier. The multiplier 21 feeds a standard I.L.S. receiver 23 which amplifies and integrates (due to its limited intermediate frequency bandwidth) the product signals and extracts the modulation components of the signal. These are separated and integrated further in band-pass filters 24 and 25 and are passed to a standard I.L.S. indicator 26 through rectifiers 27 and 28 respectively. The filters 24 and 25 and the rectifiers 27 and 28 are normally part of the standard I.L.S. receiver 23 but have been shown separately in this embodiment to facilitate understanding of the invention.

The operation of the transmitter and receiver arrangements shown in FIGURES 1 and 2 in defining an azimuthal localiser course line will now be described, reference being made to FIGURE 3 where necessary. The transmitter aerials 7 and 11 are situated one each side of an airfield runway. They have fan-like radiation patterns flooding the runway approaches with radiation. The aerials may be horn aerials. The aerials 7 and 11 are equidistant from the runway and are on a line at right angles to the runway centre-line. The signals transmitted by the aerials are generated in the manner described below.

The timing circuit 1 emits timing signals which cause the pulse generator 2 to emit pulses, each of about 0.3 microsecond duration and having a recurrence frequency of about 500 per second, which are used to modulate a carrier frequency $f_1$ from the oscillator 5 by means of the pulse modulator 4. As a result, the aerial 7 emits a short pulse of carrier frequency $f_1$. The modulation envelope of one of these pulses is shown in FIGURE 3(a). The timing circuit 1 also emits timing signals which cause the pulse generator 3 to emit pulses each of about 3.0 microseconds' duration and each having the timing of its centre coincident with the timing of the centre of a pulse from the generator 2. The pulses from the pulse generator 3 modulate, by means of the modulator 8, a carrier frequency $f_2$ from the oscillator 9. As a result, the aerial 11 radiates, inter alia, pulses on the carrier frequency $f_2$. The modulation envelope of one of these pulses is shown in FIGURE 3(b) in correct time relationship to a corresponding pulse (from the pulse modulator 4) shown in FIGURE 3(a).

Figure 3:
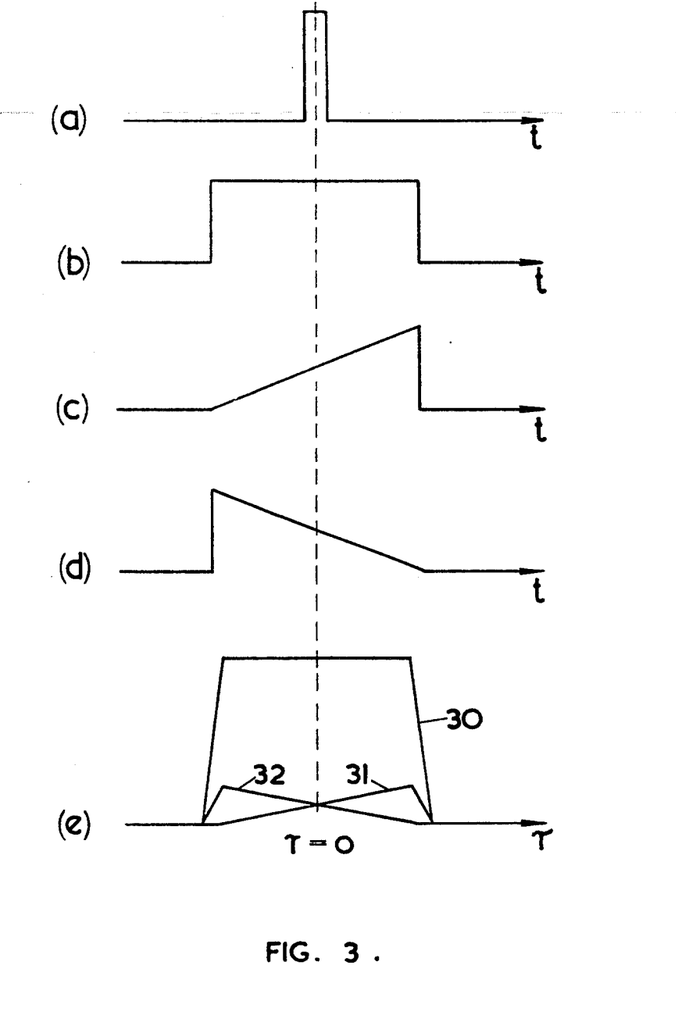
FIGURE 3 is a series of graphical diagrams illustrating the operation of the instrument landing system shown in FIGURES 1 and 2.

Each pulse from the pulse generator 3 is employed to control the ramp generator 12 so that it creates an increasing ramp voltage, of the form shown in FIGURE 3(c), each time the pulse generator 3 emits a pulse. The ramp voltage is used to amplitude modulate in the modulator 16 a double sideband, suppressed carrier, signal issuing from the modulator 14. This double sideband signal is derived from the signal of frequency $f_2$ from the oscillator 9 and a moduation signal of frequency $f_{m1}$ from the oscillator 15 and has frequencies of $f_2 \pm f_{m1}$. It follows that a signal having frequencies $f_2 \pm f_{m1}$ and recurrently modulated by the ramp waveform shown in FIGURE 3(c) will be transmitted from the aerial 11. Each pulse from the pulse generator 3 is also employed to control the ramp voltage generator 13 so that it creates a decreasing ramp voltage, of the form shown in FIGURE 3(d), each time the pulse generator 3 emits a pulse. This ramp voltage is used to amplitude modulate in the modulator 19 a double sideband, suppressed carrier, signal issuing from the modulator 17. This double sideband signal is derived frm the signal of frequency $f_2$ from the oscillator 9 and a modulation signal of frequency $f_{m2}$ from the oscillator 18 and has freqnuecies of $f_2 \pm f_{m2}$. It follows that a signal having frequencies of $f_2 \pm f_{m2}$ and recurrently modulated by the ramp waveform shown in FIGURE 3(d) will be transmitted by the aerial 11.

An aircraft flying in towards the aerials 7 and 11 and receiving the transmissions therefrom will pick up on its aerial 20 (FIGURE 2) all four transmitted signals of frequencies $f_1$, $f_2$, $f_2 \pm f_{m1}$ and $f_2 \pm f_{m2}$. If the times of receipt of all of these signals overlap, they will be multiplied together in the multiplier 21 to yield signals acceptable to the receiver 23 of frequencies $(f_2-f_1)$, $(f_2-f_1 \pm f_{m1})$ and $(f_2-f_1 \pm f_{m2})$. These signals are acceptable to the receiver 23 because it is arranged to be tuned to a centre-frequency of $(f_2-f_1)$. The above-mentioned signals acceptable to the receiver 23 form, after integration in the receiver 23, cross correlation products of the signal whose modulation envelope at the time of transmission is exemplified by the waveform shown in FIGURE 3(a) with the signals whose modulation envelopes at the time of transmission are exemplified by the waveforms shown in FIGURES 3(b), 3(c) and 3(d). If the aircraft is over the runway centre-line then the relative times of receipt of these signals will be as shown in FIGURES 3(a) to 3(d). However, if the aircraft lies to one side or the other of the runway centre-line, the transmission from the aerial 7 as exemplified by FIGURE 3(a) will lead or lag the centre of the transmissions exemplified by FIGURES 3(b) to 3(d). FIGURE 3(e) shows the cross correlation products of the signal at the frequency $(f_2-f_1)$ by means of the curve 30, of the signals at the frequencies $(f_2-f_1 \pm f_{m1})$ by means of the curve 31 and of the signals at the frequencies $(f_2-f_1 \pm f_{m2})$ by means of the curve 32, for varying amounts of relative time displacement $\tau$ between the time of receipt of the signals from the aerial 7 on the one hand and from the aerial 11 on the other. Therefore, what in effect is received, amplified, integrated et cetera by the I.L.S. receiver 23 are two double sideband signals of centre frequency $(f_2-f_1)$, the modulation depths of the two signals of modulation frequencies $f_{m1}$ and $f_{m2}$ being equal on the runway centre-line and varying differentially as the aircraft moves laterally through the runway centre-line. These signals are similar in guidance characteristics to the I.L.S. guidance signals in present day use. The centre-frequency cross correlation product obtained from the signal of frequency $(f_2-f_1)$ is used in the receiver 23 for automatic gain control purposes.

The I.L.S. receiver 23 demodulates the signals and the two modulation frequency signals (of frequency $f_{m1}$ and $f_{m2}$) are separated in the filters 24 and 25, rectified in rectifiers 27 and 28 and their relative modulation depths represented on the indicator 26.

In order for the above described system to be compatible with the present day I.L.S. aircraft receiver, the following values may be given for the frequencies $f_1$, $f_2$, and $f_{m1}$ and $f_{m2}$:

| | | |
|---|---|---|
| $f_1$ * | mc./s | 1000 |
| $f_2$ * | mc./s | 1110 |
| $f_{m1}$ | c./s | 90 |
| $f_{m2}$ | c./s | 150 |

* I.e., $f_2-f_1 = 110$ mc./s.

Figure 4:
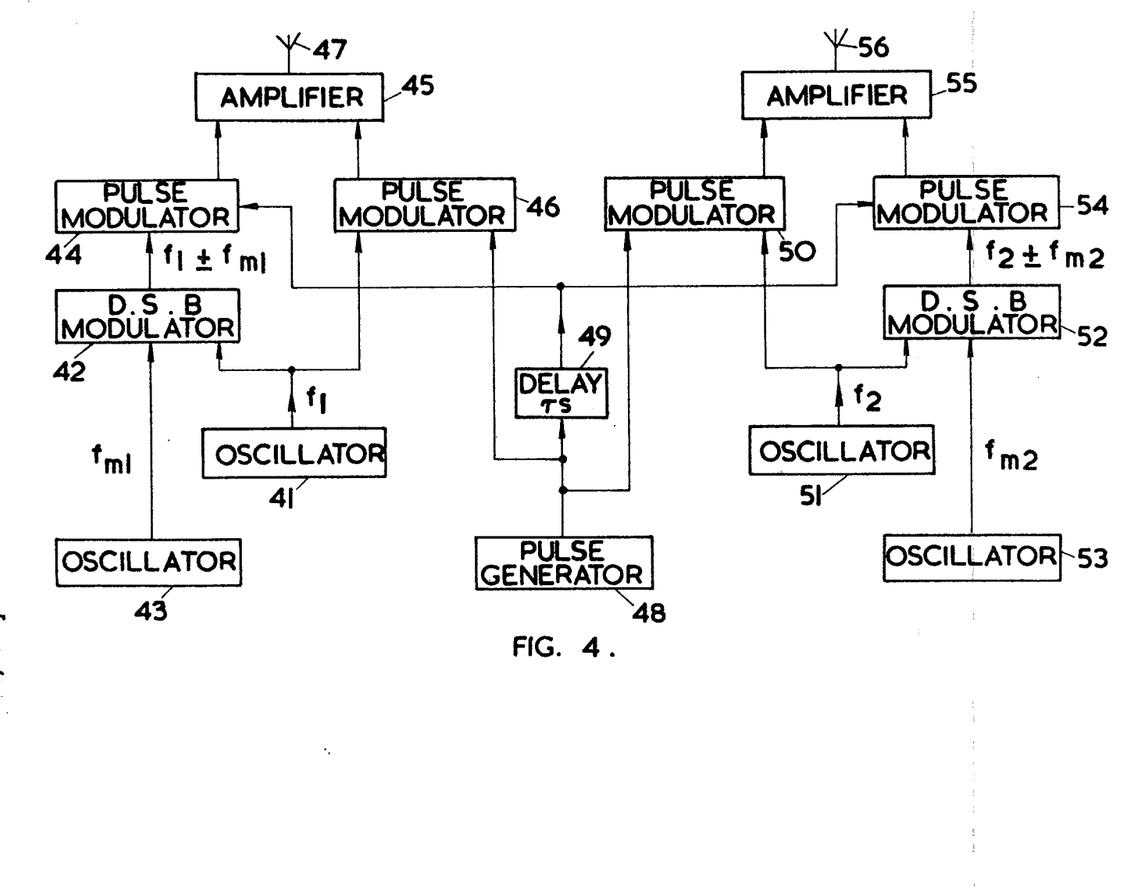
FIGURE 4 is a block circuit diagram of a different type of transmitter apparatus for an instrument landing system.

FIGURE 4 is a block circuit diagram of another form of transmitter apparatus for an instrument landing system. FIGURE 4 shows an oscillator 41 arranged to generate a frequency $f_1$ which is conveniently 1000 mc./s. This oscillator feeds a double sideband (suppressed carrier) modulator 42 which is also fed from an oscillator 43. The oscillator 43 generates a frequency $f_{m1}$ which is conveniently 90 c./s. The output of the modulator 42 feeds a pulse modulator 44 the output of which is connected to one input of an amplifier 45. The output of the oscillator 41 also feeds a pulse modulator 46 the output of which is connected to another input of the amplifier 45. The output of the amplifier 45 feeds an aerial 47.

A pulse generator 48 applies pulses directly to the pulse modulator 46 and through a delay 49 to the pulse modulator 44. The pulse generator 48 also applied pulses directly to a pulse modulator 50 to which is also applied a signal of frequency $f_2$ from an oscillator 51. The frequency $f_2$ is conveniently a frequency of 1110 mc./s. The oscillator 51 also feeds a double sideband (suppressed carrier) modulator 52 which is also fed by an oscillator 53 having a frequency of $f_{m2}$. This frequency is conveniently 150 c./s. The output of the modulator 52 is applied to a pulse modulator 54. The output of the delay 49 is also applied to the pulse modulator 54. The outputs of the modulators 50 and 54 are both applied to an amplifier 55 and thence to an aerial 56.

The operation of the circuit shown in FIGURE 4 is as follows. The aerials 47 and 56 are placed one each side of an airfield runway and are constructed to project a fan-like radio beam down, and to each side of, the runway. The aerials are equidistant from the runway centre-line and the line joining the aerials is at right angles to the runway centre-line. The frequencies $f_1$ and $f_2$ are so chosen that $f_2-f_1$ is 110 mc./s. or, more generally, lies in the range 108 mc./s. to 112 mc./s., the frequency band allocated to instrument landing systems. The pulse generator 48 generates a pulse train in which the pulses occur at irregular intervals. The duration of individual pulses in the pulse train is arranged to be approximately equal to the time taken for electromagnetic waves to traverse the whole width of the runway. The delay $\tau_s$ introduced by the delay 49 is arranged to be approximately equal to, or a little less than, half the time taken by electromagnetic waves to traverse the whole width of the runway.

The double sideband modulators 42 and 52 generate frequencies of $(f_1 \pm f_{m1})$ and of $(f_2 \pm f_{m2})$ respectively. It follows that the pulse modulators 44 and 54 generate pulses of these frequencies respectively. The aerial 47, therefore, radiates pulses at a frequency of $f_1$ and $f_1 \pm f_{m1}$, the pulses at the latter frequency being delayed by a time $\tau_s$. In a similar manner the aerial 56 radiates pulses at a frequency of $f_2$ and $f_2 \pm f_{m2}$, the pulses at the latter frequency also being delayed by a time $\tau_s$. In the case of the transmitting apparatus shown in FIGURE 4, the oscillators 41, 43, 51 and 53, together with the double sideband modulators 42 and 52 may be considered to form a radio-frequency oscillator and frequency synthesiser arrangement producing the frequencies $f_1$, $f_2$, $f_1 \pm 90$ and $f_2 \pm 150$.

The aircraft receiving system cooperating with the ground transmitting apparatus is similar to that already described with reference to FIGURE 2.

The transmitter apparatus described with reference to FIGURE 4 and aircraft receiving system described with reference to FIGURE 2 inter-cooperate in the following manner. The signals $f_1$ and $f_2$ received by the receiver from the aerials 47 and 56 respectively are cross-correlated in the multiplier 21 and the receiver 23 to provide a cross-correlation product that has a maximum amplitude when the aircraft is over the runway centre-line. This occurs because, when the aircraft is so situated, the received pulse signal trains are coincident in time. As the aircraft moves from one side to the other of the runway, the received pulse signals overlap to different extents and, therefore, the amplitude of the cross-correlation product varies symmetrically about its maximum amplitude. The cross-correlation product is formed from a signal at the difference frequency $(f_2-f_1)$ which is 110 mc./s. in the normal instrument landing system carrier frequency band.

In a similar manner, the signals of frequency $(f_1 \pm f_{m1})$ and $f_2$ from the transmitting aerials 47 and 56 respectively are multiplied together in the receiver diode mixer to provide a signal having a frequency of $(f_2-f_1 \pm 90)$. This is a signal having a carrier frequency of 110 mc./s. modulated with 90 c./s. signal. Such a signal is also acceptable to a standard instrument landing system receiver. In this instance, however, the maximum amplitude of the cross correlation product is not obtained when the aircraft is over the runway centre-line but when the aircraft lies on a hyperbola which corresponds approximately to the edge of the runway nearest the ground transmitting aerial 47. This is because of the aforementioned delay $\tau_s$ introduced into the pulse train having the carrier frequency $(f_1 \pm 90)$. As the aircraft moves from one side to the other of the hyperbola corresponding approximately to the edge of the runway nearest the aerial 47, the amplitude of the cross-correlation product will vary symmetrically about its maximum. Similarly, the signals $f_1$ and $(f_2 \pm 150)$ from the transmitting aerials 47 and 56 respectively will be cross-correlated in the multiplier 21 to provide a cross-correlation product having a frequency of $(f_1-f_2 \pm 150)$. This is a signal having a carrier frequency of, say, 110 mc./s. modulated with a 150 c./s. signal. This signal is also acceptable to a standard instrument landing system receiver.

In this case, however, the maximum of the cross-correlation product will occur when the aircraft lies on a hyperbola corresponding approximately to the edge of the runway nearest the transmitting aerial 56 and will vary symmetrically about this maximum as the aircraft moves from one side to the other of this hyperbola.

It will be seen from the above description that when the transmitter apparatus of FIGURE 4 is used with the receiver apparatus of FIGURE 2, the standard instrument landing system receiver will receive from the multiplier 21 signals which are similar to those from standard or commonly-used instrument landing system transmitters. The signal having the 150 c./s. modulation will increase in amplitude as the aircraft moves to one side of the runway and the signal having the 90 c./s. modulation will increase in amplitude as the aircraft moves to the other side of the runway, whilst the two signals will be of equal amplitude when the aircraft lies over the runway centre-line.

Many variations of the embodiment above-described with reference to FIGURE 4 will occur to those versed in the art without departing from the feature of cross-correlating appropriately modulated signals from two aerials lying one on each side of an airfield runway. Thus, for example, the positions of the aerials 47 and 56 need not be exactly equidistant from the centre-line as long as appropriate time delays are introduced into the feeds to one of the aerials to compensate for differences in transmission time to an aircraft over the centre-line of the runway. Also signals of frequency $(f_2 \pm f_{m1})$ and $(f_2 \pm f_{m2})$ may be transmitted from the same aerial as long as the pulse modulation of one is retarded by the time $\tau_s$ and the pulse modulation of the other is advanced by the $\tau_s$. The duration of the pulses in the pulse train and the time $\tau_s$ need not be exactly as described above, but may be varied in order to obtain cross correlation products in the aircraft receiver corresponding to a desired guidance response pattern. Indeed the modulation impressed upon thes ignals $f_1$, $f_2$ et cetera need not be in the form of a pulse train but may be any other modulation suitable for producing the required cross correlation responses. Such a system will now be described with reference to FIGURE 5.

Figures 5, 6:
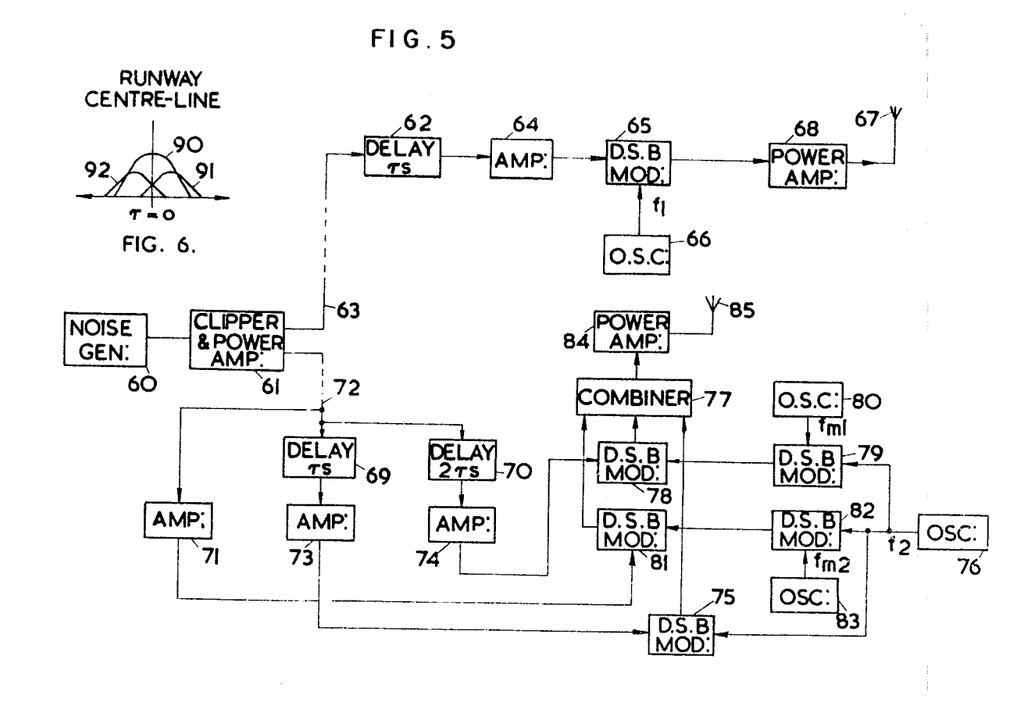
FIGURE 5 is a block circuit diagram of a still different type of transmitter apparatus for an instrument landing system.
FIGURE 6 is a graphical diagram illustrating the operation of the transmitter apparatus shown in FIGURE 5.

FIGURE 5 shows a noise generator 60 which produces thermal noise. The output of the noise generator 60 is applied to a clipper and power amplifier 61. The clipper and power amplifier feeds a delay 62 through a matched feeder 63. The delay 62 introduces a delay of $\tau_s$ into the signal received over the feeder 63. The output of the delay 62 is amplified in an amplifier 64 and is then applied to a double sideband (suppressed carrier) modulator 65 in which it modulates a signal of carrier frequency $f_1$ from an oscillator 66. The output of the modulator 65 is applied to an aerial 67 through a power amplifier 68. The output of the aerial 67 is, therefore, a signal of carrier frequency $f_1$ modulated by noise.

The clipper and power amplifier 61 also feeds two delay lines 69 and 70 and an amplifier 71 through a matched feeder 72. The electrical length of the feeder 72 is the same as that of the feeder 63. The delays 69 and 70 have delay times of $\tau_s$ and $2\tau_s$ respectively. The outputs of the delays 69 and 70 are applied to amplifiers 73 and 74 respectively. The output of the amplifier 73 is applied to a double sideband modulator 75 in which it modulates the output of an oscillator 76 which has a carrier frequency $f_2$. The output of the modulator 75 is applied to a linear combiner 77.

The output of the amplifier 74 is applied to a double sideband (suppressed carrier) modulator 78, the output of which is applied to the combiner 77. The oscillator 76 feeds a double sideband (suppressed carrier) modulator 79 which is also fed from an audio-frequency oscillator 80 having a frequency of $f_{m1}$. The output of the modulator 79 is applied to a second input of the modulator 78.

The output of the amplifier 71 is applied to a double sideband (suppressed carrier) modulator 81, the output of which is fed to the combiner 77. The oscillator 76 feeds a double sideband (suppressed carrier) modulator 82 which is also fed from an audio-frequency oscillator 83 having a frequency of $f_{m2}$. The output of the modulator 82 is applied to a second input of the modulator 81. The output of the combiner 77 is applied to a power amplifier 84 and thence to an aerial 85.

The amplifier 64 is arranged to amplify noise signals in the range 1 mc./s. to 3 mc./s. The amplifiers 71, 73 and 74 are arranged to amplify noise signals in the range 1 mc./s. to 3 mc./s., 1.5 mc./s. to 2.5 mc./s. and 1 mc./s. to 3 mc./s. respectively. The frequencies $f_1$ and $f_2$ may conveniently be 1000 mc./s. and 1110 mc./s. respectively to yield a difference frequency of 110 mc./s. The audio-frequencies $f_{m1}$ and $f_{m2}$ are 90 c./s. and 150 c./s., respectively, in order to render the transmitting apparatus compatible with present-day instrument landing system practice. The delay $\tau_s$ is the time corresponding to half the maximum range of control of the system and is approximately equal to the time taken by electromagnetic waves to travel half the width of the runway when the transmitter apparatus is being used in an instrument landing system localiser.

The operation of the embodiment shown in FIGURE 5 will now be described, reference being made, where necessary, to FIGURE 6. In the case of this embodiment, the various cross correlation products are provided by the multiplication together and subsequent integration of the various signals which are modulated by the noise. A cross-correlation product is in this case a maximum when two signals modulated by the noise are received such that the noise components have no relative time displacement. Thus, the aerial 67 emits a carrier wave of frequency $f_1$ modulated by noise delayed by a time $\tau_s$. The aerial 85 emits three distinct signals. The first of these is derived from the modulator 75 and is a carrier wave of frequency $f_2$ modulated by the noise delayed by the time $\tau_s$. If, in a localiser of an instrument landing system, the aerials 67 and 85 are placed one each side of an airfield runway so that they are equidistant from the runway and the line joining them is at right angles to the runway, the cross-correlation product of the above-mentioned two signals from the aerials 67 and 85 will be a maximum along the centre-line of the runway and will gradually be reduced to each side of the centre-line as indicated by the curve 90 in FIGURE 6. A second signal emitted by the aerial 85 is derived from the modulator 78 and consists of a frequency of $f_2 \pm f_{m1}$ modulated by a late version of noise. That is to say, the modulating noise is relatively delayed by a delay $2\tau_s$. This signal combined with the signal from the aerial 67 in a multiplier, such as the multiplier 21 (FIGURE 2), and subsequently integrated results in a cross correlation product formed from a signal at a frequency of $f_2 - f_1 \pm f_{m1}$ which is a maximum to one side of the runway and has a characteristic similar to that shown at 91 in FIGURE 6.

A third signal emitted by the aerial 85 is derived from the modulator 81 and consists of a frequency $f_2 \pm f_{m2}$ modulated by an early version of the noise. That is to say, the noise has no relative delay. This signal combined with the signal from the aerial 67 in a multiplier, such as the multiplier 21 (FIGURE 2), and subsequently integrated results in a cross-correlation product at a frequency of $f_2 - f_1 \pm f_{m2}$ which has a maximum to the other side of the runway and has a characteristic amplitude variation similar to that shown at 92 in FIGURE 6.

As intimated above by the references to the multiplier 21, a suitable receiving arrangement for use with the embodiment of FIGURE 5 is the receiver shown in FIGURE 2. In this case, the indicator 26 indicates the relative depths of modulation of the signals of frequency $f_2 - f_1 \pm f_{m1}$ and $f_2 - f_1 \pm f_{m2}$, the depths of modulation being equal over the runway centre-line.

The embodiment shown in FIGURE 5 has been described above as providing equal depths of modulation over the runway centre-line. However, by adjusting the delay introduced by the delay 62, the path providing equal depths of modulation may be made into a hyperbolic curve so that an aircraft can be guided on to an airfield runway along a curved path.

Figure 7:
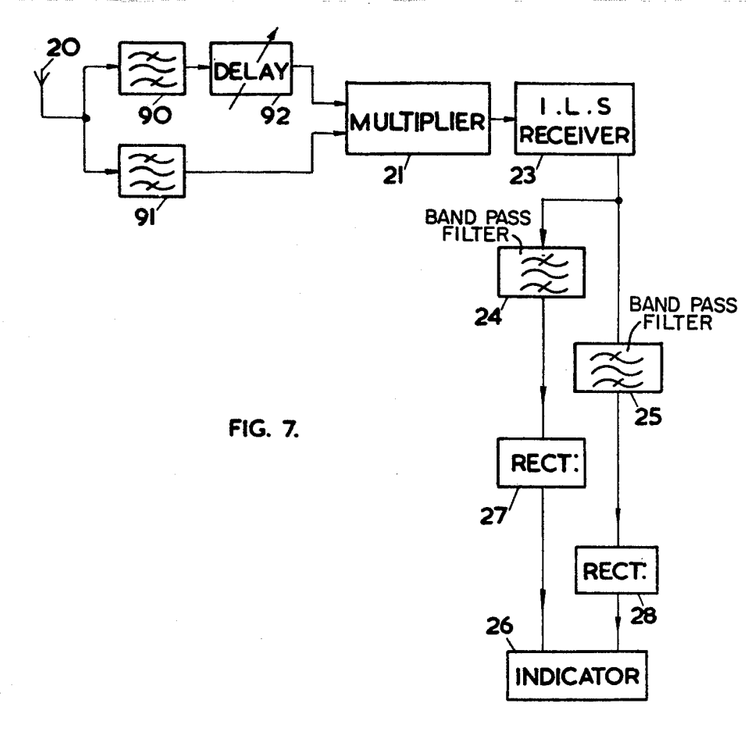
FIGURE 7 is a block diagram of an alternative form of receiving apparatus for an instrument landing system.

An aircraft may also be guided along a curved path to an airfield runway by the use of an alternative form of receiver as illustrated in FIGURE 7. In FIGURE 7 similar components to those shown in FIGURE 2 are designated by the same reference numerals.

FIGURE 7 shows an aircraft aerial 20 feeding two filters 90 and 91. The output of the filter 90 is fed to a multiplier 21 through a variable delay 92. The output of the filter 91 is fed directly to the multiplier 21. The output of the multiplier 21 is fed to an I.L.S. receiver 23. The output of the receiver 23 is fed via filters 24 and 25 and rectifiers 27 and 28 to an I.L.S. indicator 26.

The receiver shown in FIGURE 7 may be used in conjunction with the transmitter apparatus shown in FIGURE 1 or 5. The operation of the receiver shown in FIGURE 7 will now be described. The filter 90 is a band pass filter which separates out the signals centered on the frequency $f_1$. This signal is then delayed in the variable delay 92 before application to the multipler 21. The filter 91 is a band pass filter designed to pass all signals centered on the frequency $f_2$. The effect is the same as adjusting the delay 62 of FIGURE 5. The delay 92 is so adjusted that when the signal centered on the frequency $f_1$ is cross correlated in the multiplier 21 and the receiver 23 with the signals centered on the frequency $f_2$ the relative depths of modulation of the cross-correlation products formed from signals having the frequencies $f_2-f_1\pm f_{m1}$ and $f_2-f_1\pm f_{m2}$ are equal along a curved hyperbolic path. The remainder of the circuit shown in FIGURE 7 operates in a similar manner to the corresponding parts of the circuit described with reference to FIGURE 2.

In the above description of the various embodiments of the invention, frequencies $f_1$ and $f_2$ have been described as being conveniently 1000 mc./s. and 1110 mc./s. respectively. The frequencies may, however, be chosen differently as long as, for a system compatible with present-day I.L.S. systems, their difference frequency lies in the band 108 mc./s. to 112 mc./s.

Figure 8A:
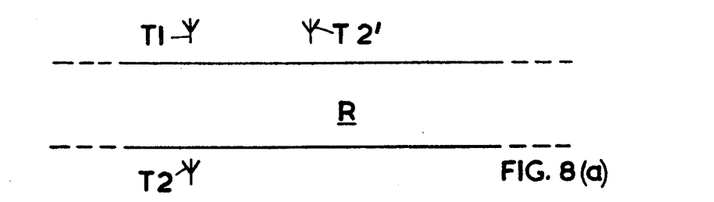
FIGURES 8(a) and 8(b) illustrate various possible configurations of aerials in relation to an airfield runway.

FIGURE 8(a) shows the disposition of two aerials $T_1$ and $T_2$ one on each side of an airfield runway R so as to provide azimuthal guidance to aircraft landing on the runway. The aerials $T_1$ and $T_2$ correspond to the aerials 7 and 11 of FIGURE 1, the aerials 47 and 56 of FIGURE 4 and the aerials 67 and 85 of FIGURE 5 respectively.

Figure 8B:
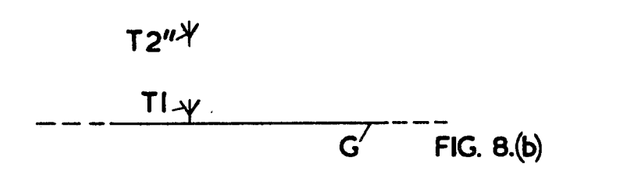

The present invention is not, however, limited to the provision of localiser azimuthal guidance, but may also be adapted to glide path guidance. For this purpose, the aerials may be placed in relation to the runway R as illustrated at $T_1'$ and $T_2'$ in FIGURE 8(a). Alternatively they may be placed one vertically above the other to one side of the runway as illustrated at $T_1$ and $T_2''$ in FIGURE 8(b). In FIGURE 8(b), G represents the ground plane. The aerials $T_1$ and $T_2''$ may conveniently be spaced thirty feet apart. In order that the required glide path to guide the aircraft down to a suitable point on or above the ground should be represented by equal depths of modulation at the frequencies $f_{m1}$ and $f_{m2}$, the delay, such as the delay 62 in FIGURE 5 or the delay 92 in FIGURE 7, must be adjusted to provide the required curved hyperbolic locus for the point yielding equal depths of modulation.

It will be understood by those versed in the art that the above-described embodiments are by way of example only and that other combinations of signals may be used to obtain the desired result.

For example one aerial may transmit a signal of the form $\sin \omega_0 t$ whilst the other aerial may transmit signals of the form $\cos \omega_{m1} t \cdot \cos \omega_0 (t-\tau_s)$ and $\cos \omega_{m2} \cdot \cos \omega_0 (t+\tau_s)$ where $\omega_{m1}$ and $\omega_{m2}$ are pulsatances corresponding to two modulation frequencies, which may be 90 cycles/second and 150 cycles/second in order to make the system compatible with present day instrument landing systems. The pulsatance $\omega_0$ corresponds to a carrier frequency of, for example, 108 kc./s., whilst $\tau_s$ is a time delay chosen to produce the required differential variation of the amplitudes of the modulation frequencies as a receiver is moved transversely across the runway. In this case, the standard I.L.S. receiver 23 of FIGURE 2 must be modified to receive signals centered on a carrier frequency corresponding to the pulsatance $\omega_0$.

We claim:

1. Transmitter apparatus for an instrument landing system and comprising a first transmitter aerial and a second transmitter aerial both located adjacent an aircraft runway, signal generator means for controlling the timing and form of first, second, third and fourth time varying signals, means connected to the said first transmitter aerial and to said signal generator means for generating a first carrier frequency signal carrying as modulation said first time varying signal, means connected to the said second transmitter aerial and to said signal generator means for generating a second carrier frequency signal carrying as modulation said second time varying signal, means connected to one of the said first transmitter aerial and the said second transmitter aerial and to said signal generator means for generating a third carrier frequency signal carrying as modulation said third time varying signal and means connected to the second aerial and to said signal generator means for generating a fourth carrier frequency signal carrying as modulation said fourth time varying signal, the timing and form of said time varying signals being such that they yield cross-correlation products the amplitudes of two of which vary differentially as a point of reception moves from one side to the other of a desired guidance path and the amplitude of one of which is a maximum on the desired guidance path.

2. Transmitter apparatus for an instrument landing system and comprising a first transmitter aerial and a second transmitter aerial both located adjacent an aircraft runway, signal generator means for controlling the timing and form of first, second and third time varying signals, means connected to the said first aerial and to said signal generator means for feeding a first carrier frequency signal modulated by said first time varying signal to the said first aerial, means connected to the said second aerial and to said signal generator means for feeding a second carrier frequency signal modulated by said second time varying signal to the said second aerial and means connected to the said second aerial and to said signal generator means for feeding a third carrier frequency signal modulated by said third time varying signal to the said second aerial, the said first time varying signal together with the said second and third time varying signals yielding two cross-correlation products which are equal in amplitude when the signals are received on a desired guidance path and which vary differentially in amplitude with respect to one another as the point of reception moves from one side to the other of the desired guidance path.

3. Transmitter apparatus as claimed in claim 2 and wherein said signal generator means is arranged to control the form and timing of a fourth time varying signal and there is provided means connected to the said second aerial and to said signal generator means for feeding a fourth carrier frequency signal modulated by said fourth time varying signal to the said second aerial, said first time varying signal and said fourth time varying signal yielding a cross-correlation product which is a maximum when the signals are received on the desired guidance path.

4. Transmitter apparatus as claimed in claim 3 and wherein the first time varying signal is a recurrent relatively narrow pulse, the second time varying signal is a recurrent increasing ramp voltage, the third time varying signal is a recurrent decreasing ramp voltage and the fourth time varying signal is a recurrent relatively wide pulse of approximately the same duration as the ramp voltages, the time varying signals having the same recurrence periods.

5. Transmitter apparatus as claimed in claim 4 and wherein the first carrier frequency signal has a frequency $f_1$, the second carrier frequency signal has frequencies $f_2 \pm f_{m1}$, the third carrier frequency signal has frequencies $f_2 \pm f_{m2}$ and fourth carrier frequency signal has a frequency $f_2$, the modulus of the difference frequency $f_2-f_1$ lying in the range 108 megacycles per second to 112 megacycles per second, $f_{m1}$ and $f_{m2}$ being two different tone frequencies.

6. Transmitter apparatus as claimed in claim 5 and wherein the tone frequency $f_{m1}$ is 90 cycles per second and the tone frequency $f_{m2}$ is 150 cycles per second.

7. Receiver apparatus for use in conjunction with the transmitter apparatus claimed in claim 6 and comprising an aerial, a multiplier connected to the said aerial for multiplying together the various signals received at the said aerial, a receiver connected to the said multiplier, a 150 cycles per second band pass filter connected to the output of the said receiver, a 90 cycle per second band pass filter connected to the output of the said receiver, a separate rectifier connected to the output of each filter and a differential indicator connected to the outputs of the rectifiers.

8. Transmitter apparatus as claimed in claim 3 and wherein the first time varying signal is a noise signal, the second time varying signal is the same noise signal advanced in time relative to the first time varying signal, the third time varying signal is the same noise signal delayed in time relative to the first time varying signal and the fourth time varying signal is the same noise signal occurring at the same time as the first time varying signal.

9. Transmitter apparatus as claimed in claim 8 and wherein the first carrier frequency signal has a frequency $f_1$, the second carrier frequency signal has frequencies $f_2 \pm f_{m1}$, the third carrier frequency signal has frequencies $f_2 \pm f_{m2}$ and the fourth carrier frequency signal has a frequency $f_2$, the modulus of the difference frequency $f_2 - f_1$ lying in the range 108 megacycles per second to 112 megacycles per second, $f_{m1}$ and $f_{m2}$ being two different tone frequencies.

10. Transmitter apparatus as claimed in claim 9 and wherein the tone frequency $f_{m1}$ is 90 cycles per second and the tone frequency $f_{m2}$ is 150 cycles per second.

11. Receiver apparatus for use in conjunction with the transmitter apparatus claimed in claim 10 and comprising an aerial, a multiplier connected to the said aerial for multiplying together the various signals received at the said aerial, a receiver connected to the said multiplier, a 150 cycles per second band pass filter connected to the output of the said receiver, a 90 cycles per second band pass filter connected to the output of the said receiver, a separate rectifier connected to the output of each filter and a differential indicator connected to the outputs of the rectifiers.

12. Receiver apparatus for use in conjunction with the transmitter apparatus claimed in claim 2 and comprising a receiver aerial, a first band pass filter connected to the said receiver aerial for passing signals derived from one of the aerials of the transmitter apparatus, a delay connected to the output of the first band pass filter, a second band pass filter connected to the said receiver aerial for passing signals derived from the other of the aerials of the transmitter apparatus, a multiplier connected to the said delay and to the said second band pass filter for multiplying together signals from the delay and the second band pass filter, a receiver connected to the multiplier for receiving the product signals at the output of the multiplier and means connected to the receiver for separating out distinctive modulation signals from said product signals.

13. Transmitter apparatus for an instrument landing system and comprising a first transmitter aerial and a second transmitter aerial both located adjacent an aircraft runway, signal generator means for controlling the timing and form of first, second, third and fourth time varying signals, means connected to the said first aerial and to said signal generating means for feeding a first carrier frequency signal modulated by said first time varying signal to the said first aerial, means connected to the said second aerial and to said signal generating means for feeding a second carrier frequency signal modulated by said second time varying signal to the said second aerial, means connected to the said first aerial and to said signal generator means for feeding a third carrier frequency signal modulated by said third time varying signal to the said first aerial and means connected to the said second aerial and to said signal generating means for feeding a fourth carrier frequency signal modulated by said fourth time varying signal to the said second aerial, the first time varying signal together with the second time varying signal and the third time varying signal together with the fourth time varying signal yielding two cross-correlation products which are equal in amplitude when the signals are received on a desired guidance path and which vary differentially in amplitude with respect to one another as the point of reception moves from one side to the other of the desired guidance path.

14. Transmitter apparatus as claimed in claim 13 and wherein the first time varying signal and the fourth time varying signal yield a cross-correlation product which is a maximum when the signals are received on the desired guidance path.

15. Transmitter apparatus as claimed in claim 14 and wherein the first time varying signal is a recurrent pulse, the second time varying signal is a recurrent pulse delayed in time from the first time varying signal, the third time varying signal is a recurrent pulse delayed in time from the first time varying signal and the fourth time varying signal is a recurrent pulse occurring at approximately the same time as the pulse in the first time varying signal.

16. Transmitter apparatus as claimed in claim 15 and wherein the first carrier frequency signal has a frequency $f_1$, the second carrier frequency signal has frequencies $f_2 \pm f_{m2}$, the third carrier frequency signal has frequencies $f_1 \pm f_{m1}$ and the fourth carrier frequency signal has a frequency $f_2$, the modulus of the difference frequency $f_2 - f_1$ lying in the range 108 megacycles per second to 112 megacycles per second, $f_{m1}$ and $f_{m2}$ being two different tone frequencies.

17. Transmitter apparatus as claimed in claim 16 and wherein the tone frequency $f_{m1}$ is 90 cycles per second and the tone frequency $f_{m2}$ is 150 cycles per second.

18. Transmitter apparatus as claimed in claim 1 and wherein the aerials are placed one each side of an airfield runway such that they are equidistant from the runway centre-line and the line joining them is at right angles to the runway centre-line.

19. Transmitter apparatus as claimed in claim 1 and wherein the aerials are both placed to one side of the runway such that the line joining them is substantially parallel to the runway centre-line.

20. Transmitter apparatus as claimed in claim 1 and wherein the aerials are located one vertically above the other to one side of the runway.

21. Receiver apparatus for use in conjunction with the transmitter apparatus claimed in claim 1 and comprising an aerial, a multiplier connected to the said aerial for multiplying together the various signals received at the said aerial, a receiver connected to the multiplier for receiving the cross-correlation products at the output of the said multiplier and means connected to the receiver for separating out distinctive modulation signals from the cross-correlation products.

22. Receiver apparatus for use in conjunction with the transmitter apparatus claimed in claim 17 and comprising an aerial, a multiplier connected to the said aerial for multiplying together the various signals received at the said aerial, a receiver connected to the said multiplier, a 150 cycles per second band pass filter connected to the output of the said receiver, a 90 cycles per second band pass filter connected to the output of the said receiver, a separate rectifier connected to the output of each said filter and a differential indicator connected to the outputs of the rectifiers.

23. Transmitter apparatus for an instrument landing system and comprising a first aerial and a second aerial both located adjacent an aircraft runway, means connected to the said first aerial for generating a succession of relatively short pulses of carrier frequency $f_1$, means connected to the said second aerial for generating a succession of relatively longer pulses of carrier frequency $f_2$, first generator means for generating a first signal having frequencies $f_2 \pm f_{m1}$, first modulator means connected to the said first generator means and to the said second aerial for modulating the said first signal with a succession of increasing ramp voltages, second generator means for generating a second signal having frequencies $f_2 \pm f_{m2}$ and second modulator means connected to the second generator means and to the second aerial for modulating the said second signal with a succession of decreasing ramp voltages, the durations of each said relatively longer pulse and of each of the said ramp voltages being substantially the same $f_{m1}$ and $f_{m2}$ being two different tone frequencies.

24. Transmitter apparatus for an instrument landing system and comprising a first aerial and a second aerial both located adjacent an aircraft runway, means connected to the said first aerial for generating a first succession of pulses of carrier frequency $f_1$, means connected to the said second aerial for generating a second succession of pulses of carrier frequency $f_2$, first generator means for generating a first signal having frequencies $f_1 \pm f_{m1}$, first modulator means connected to the said first generator means and to the said first aerial for modulating the said first signal with a third succession of pulses, second generator means for generating a second signal having frequencies $f_2 \pm f_{m2}$ and second modulator means connected to the said second generator means and to the said second aerial for modulating the said second signal with a fourth succession of pulses, each pulse in the said first succession of pulses being contemporaneous with a pulse in the second succession of pulses and each pulse in the said third succession of pulses being contemporaneous with a pulse in the said fourth succession of pulses but starting a predetermined time after the start of a pulse in the said first succession of pulses $f_{m1}$ and $f_{m2}$ being two different tone frequencies.

25. Transmitter apparatus for an instrument landing system and comprising a first aerial and a second aerial located adjacent an aircraft runway, noise generating means, a first oscillator having a frequency $f_1$, first delay means connected to the noise generating means for delaying the output thereof by a time $\tau_s$, first modulator means connected to the said first delay means, to the said first oscillator and to the said first aerial for double sideband suppressed carrier modulation of the frequency $f_1$, second delay means connected to the said noise generating means for delaying the output thereof by a time $\tau_s$, a second oscillator having a frequency $f_2$, second modulator means connected to the said second delay means, to the said second oscillator and to the said second aerial for double sideband suppressed carrier modulation of the frequency $f_2$, a third oscillator having a frequency $f_{m2}$, third modulator means connected to said second oscillator and to the same third oscillator to provide a signal of frequencies $f_2 \pm f_{m2}$, fourth modulator means connected to the said noise generating means, to the said third modulator means and to the said second aerial for double side band suppressed carrier modulation of the frequencies $f_2 \pm f_{m2}$, third delay means connected to the noise generating means for delaying the output thereof by a time $2\tau_s$, a fourth oscillator having a frequency $f_{m1}$, fifth modulating means connected to the said second oscillator and to the said fourth oscillator to provide a signal of frequencies $f_2 \pm f_{m1}$ and sixth modulating means connected to the said third delay means, to the said fifth modulating means and to the said second aerial for double side band suppressed carrier modulation of the frequencies $f_2 \pm f_{m1}$.

26. Transmitter apparatus as claimed in claim 25 and wherein the modulus of $f_2 - f_1$ lies in the range 108 megacycles per second and 112 megacycles per second.

27. Transmitter apparatus as claimed in claim 26 and wherein $f_{m1}$ is 90 cycles per second and $f_{m2}$ is 150 cycles per second.

28. Transmitter apparatus for an instrument landing system and comprising a first transmitter aerial and a second transmitter aerial both located adjacent an aircraft runway, signal generator means for controlling the timing and form of first, second, third and fourth time varying signals, means connected to the said first transmitter aerial and to said signal generator means for generating a first carrier frequency signal of frequency $f_1$ modulated with said first time varying signal, means connected to the said second transmitter aerial and to said signal generator means for generating a second carrier frequency signal of frequency $f_2$ modulated by said second time varying signal, the modulus of the frequency difference $f_2 - f_1$ lying in an instrument landing system carrier frequency band, means connected to said signal generator means for applying to said first aerial a first distinctive signal having said first carrier frequency modulated by said third time varying signal, means connected to said signal generator means for applying to said second aerial a second distinctive signal having said second carrier frequency modulated by said fourth time varying signal, the time varying signals being so related in timing and form that said second time varying signal and said third time varying signal yields a cross-correlation product the amplitude of which varies in one sense as a point of reception moves in a direction from one side to the other of a desired guidance path and that said first time varying signal and said fourth time varying signal yield a cross-correlation product the amplitude of which varies in the opposite sense as said point of reception moves in said direction.

29. Transmitter apparatus as claimed in claim 28 wherein there are provided means, connected to said means for applying a first distinctive signal to said first aerial, for generating a first tone signal and modulating said first distinctive signal therewith and means, connected to said means for applying a second distinctive signal to said second aerial, for generating a second tone signal and modulating said second distinctive signal therewith.

30. Transmitter apparatus for an instrument landing system and comprising a first transmitter aerial and a second transmitter aerial both located adjacent an aircraft runway, signal generator means for controlling the timing and form of first, second, third and fourth time varying signals, means connected to said first transmitter aerial and to said signal generator means for generating a first carrier frequency signal of frequency $f_1$ modulated with said first time varying signal, means connected to said second transmitter aerial and to said signal generator means for generating a second carrier frequency signal of frequency $f_2$ modulated by said second time varying signal, the modulus of the frequency difference $f_2 - f_1$ lying in an instrument landing system carrier frequency band, means connected to said signal generator means for applying to said first aerial a first distinctive signal having said first carrier frequency modulated by said third time varying signal, means connected to said signal generator means for applying to said first aerial a second distinctive signal having said first carrier frequency modulated by said fourth time varying signal, the time varying signals being so related in timing and form that said second time varying signal together with said third time varying signal and said fourth time varying signal forms two cross-correlation products the amplitudes of which vary differentially as a point of reception moves from one side to the other of a desired guidance path.

31. Transmitter apparatus as claimed in claim 30 wherein there are provided means, connected to said means for applying a first distinctive signal to said first aerial, for generating a first tone signal and modulating said first distinctive signal therewith and means, connected to said means for applying a second distinctive signal to said first aerial, for generating a second tone signal and modulating said second distinctive signal therewith.

References Cited

UNITED STATES PATENTS

| | | |
|---|---|---|
| 2,284,247 | 5/1942 | Bagnall. |
| 2,748,385 | 5/1956 | Rust et al. _________ 343—105 X |
| 3,082,419 | 3/1963 | Crossland _________ 343—108 |
| 3,153,237 | 10/1964 | Lakatos. |

RODNEY D. BENNETT, *Primary Examiner.*

H. C. WAMSLEY, *Assistant Examiner.*